US012391598B2

(12) United States Patent
Andela et al.

(10) Patent No.: US 12,391,598 B2
(45) Date of Patent: Aug. 19, 2025

(54) PRODUCTION OF GLASS SAND (71) Applicants: Cynthia Andela, Richfield Springs, NY (US); David Martin, N. Andover, MA (US)

(72) Inventors: Cynthia Andela, Richfield Springs, NY (US); David Martin, N. Andover, MA (US)

( * ) Notice: Subject to any disclaimer, the term of this patent is extended or adjusted under 35 U.S.C. 154(b) by 839 days.

(21) Appl. No.: 17/803,144

(22) Filed: Mar. 4, 2022

(65) Prior Publication Data

US 2023/0278908 A1 Sep. 7, 2023

(51) Int. Cl.
*C03C 1/00* (2006.01)
*B03B 9/06* (2006.01)
*B03C 1/30* (2006.01)

(52) U.S. Cl.
CPC .............. *C03C 1/002* (2013.01); *B03B 9/062* (2013.01); *B03C 1/30* (2013.01); *B03C 2201/20* (2013.01); *Y02W 30/52* (2015.05); *Y02W 30/60* (2015.05)

(58) Field of Classification Search
CPC ....... B03B 9/062; Y02W 30/52; Y02W 30/60; C03C 1/002
See application file for complete search history.

(56) References Cited

U.S. PATENT DOCUMENTS

| 5,620,101 | A | 4/1997 | Andela |
| 5,944,268 | A | 8/1999 | Andela |
| 7,413,602 | B2 | 8/2008 | Grasso et al. |
| 7,931,220 | B2 * | 4/2011 | Grasso, Jr. .............. C04B 28/04 |
| | | | 241/60 |
| 8,146,841 | B2 * | 4/2012 | Andela ................... B03B 9/062 |
| | | | 241/24.22 |
| 2020/0108413 | A1 | 4/2020 | Bierma |

FOREIGN PATENT DOCUMENTS

WO WO-2023131668 A1 * 7/2023 ............. B29B 17/00

* cited by examiner

*Primary Examiner* — Bobby Yeonjin Kim
(74) *Attorney, Agent, or Firm* — Hinckley, Allen & Snyder; Stephen Holmes (57) ABSTRACT

A system for producing a stream of glass sand from mixed recyclables comprises first and second pulverizing system, each comprising a size-reducing pulverizer and a size-separating trommel. The pulverizers and trommels are heated, so as to also serve as driers.

9 Claims, 7 Drawing Sheets

PRODUCTION OF GLASS SAND

FIELD OF THE INVENTION

The present invention relates to the production of glass sand, particularly as needed in the construction industry, from a typical post-consumer waste glass stream also including other materials and contaminants.

BACKGROUND OF THE INVENTION

Post-consumer or post-industrial glass is currently largely disposed of in landfills because it is of mixed color and is mixed with odorous non-glass residue. Andela U.S. Pat. No. 8,146,841, reissued as RE 45,290 (the "Andela '841 patent" herein), incorporated herein by this reference, shows a system for producing clean glass particles from the typical waste stream. This application shows a further improvement on the system of the Andela '841 patent, wherein the system is optimized for economic production of glass particles useful as a replacement for sand, which is in short supply.

Glass sand has a number of benefits as engineered sand. It is angular in shape with superior filtration properties. It is impermeable and inert, so there is no leaching of minerals or breakdown over time. It is lighter than most sands and has a good gradation with minimal fines and no clay content. It is safer than sand, since it is crystalline and silica-free with an amorphous structure that is not considered a hazardous fine dust by OSHA.

As a renewable resource, glass can be mined out of the urban waste stream. Approximately 9-11 million tons of glass are used and disposed of every year in the United States. Only a small fraction—e.g., 2 million tons—is recovered and recycled into to new bottles or fiberglass. With proper recovery and processing, a much larger fraction of the glass can be transformed into engineered sand. The present application is directed to this purpose.

Clean glass particles that have rounded edges, are free of odor and have very low levels of organics could be used as a substitute for crystalline silica sand or crushed stone in a variety of applications and uses. These uses include but are not limited to: fiberglass or specialty glass; abrasives for blasting, scouring cleansers, sawing and sanding; filtration for swimming pools or other water filtration; manufacturing bricks, tiles or countertops; recreational uses on golf courses, beaches, and playgrounds; as roofing materials; as a substitute for natural sand or crushed stone in manufacturing concrete products; and for general construction and landscaping uses. As mentioned, the present application is directed to equipment and methods for producing glass sand engineered specifically for construction purposes as a constituent of concrete or as a replacement for septic sand.

For glass particles to be suitable for many of the uses listed above, the organic concentration must be less than 0.5%, as measured by a standard Loss-On-Ignition (LOI) test. As is well known to those of skill in the art, LOT refers to the mass loss of a combustion residue whenever it is heated in an air or oxygen atmosphere to high temperatures. In the cement industry, use of the term LOI normally refers to a mass loss m a sample heated to 950° C. To combustion engineers, the term LOI normally refers to mass losses in samples heated to temperatures less than 950° C. These test methods establish a procedure for determining LOI values for combustion residues heated to 750° C. or 950° C. LOI values from these test methods can be used by industries that utilize combustion residues in various processes and products. Glass sand for construction purposes does not need as low an LOI as required for, e.g., abrasives or water filtration purposes. Accordingly, some of the steps disclosed in the '841 patent to reduce LOI can be eliminated in the present application.

One of the present inventors and others have disclosed in U.S. Pat. No. 7,413,602, incorporated herein by this reference, a process and equipment for producing a fine glass powder that is useful as a pozzolanic constituent of concrete from post-consumer waste streams containing a large fraction of glass mixed with other materials. As in the case of the Andela '841 patent, the present invention is directed primarily toward production of larger glass particles, e.g., of the size of grains of sand, and thus useful as a substitute for sand as used for construction purposes, e.g., as a replacement for sand used in making concrete, asphalt, or as underdrain or septic field sand. To be acceptable for such use the glass particles must have low levels of organics, as above, so as not to give off unpleasant odors, and of course all the non-glass constituents of the waste stream must be removed.

One important aspect of the invention of the Andela '841 patent addressed a problem that had not previously been solved in the production of clean glass particles from a post-consumer waste stream, that is, the removal of all paper from the glass particles. Large scraps of paper are readily removed, but tiny fibrous shreds are difficult to remove. Other processes and equipment that have been used in the industry to dry and process waste glass have used a rotary dryer or similar device with an open flame to burn off any residual paper. This process results in residual ashes mixed with the fine glass. As the glass is screened for size separation, it is found that the finer the particle size and grade of glass, the darker the color of the glass mix. The dark color can be attributed to the ash content in the glass.

One of the present inventors and others have disclosed in U.S. Pat. No. 7,413,602, incorporated herein by this reference, a process for producing fine glass powder that includes the step of washing the glass particles in a water immersion system to remove paper and other contaminants. The present invention does not use water for washing the glass particles, and thereby eliminates the sediment-removal and water filtration steps that were required in that process.

As part of the production of engineered glass sand, the glass particles must be separated by size, so as to provide a uniform particle size. This typically requires screening the glass particles, to provide a size-based separation. This is turn requires that the particles be dry, so that the screens do not clog with wet particles. In the Andela '841 patent, drying was performed using a fluidized bed dryer. It is desired to eliminate this particular piece of equipment.

SUMMARY OF THE INVENTION

According to the invention, clean glass particles suitable as a replacement for sand can be produced from a typical post-consumer mix of broken and dirty glass that is mixed with paper, plastics, organics, and metals, where the glass is 80%-95% of the mix, by weight. This is a typical mix and composition of the waste glass stream produced by single-stream curbside and drop-off recycling programs and post-industrial glass scrap, in the United States and around the world. Without limiting the invention, the process of the invention comprises a series of removal of non-glass constituents, size reduction, screening, sanitizing, drying, classification, and density separation steps.

The process described here selectively reduces the glass so it can be separated from the non-glass material, and then cleans and separates the glass particles by size in such a way that the resulting granulated amorphous silica (glass) particles can be sold as a replacement for sand as used in the construction industry.

In general, no pre-screening or presorting of the mixture of broken glass, paper, plastic, and metal found in the typical post-consumer recycle stream is necessary, although the non-glass material mixed with the glass should generally be less than six inches in maximum dimension. Many post-industrial waste glass streams can be similarly processed.

The unsorted, dirty post-consumer mix and/or post-industrial waste glass mix is loaded into a surge hopper to meter the material onto a conveyor. A cross-belt magnet is used to remove the ferrous metal. The material is then conveyed into a glass pulverizer to selectively reduce the glass to particles less than ⅜" or ½" in size. The non-glass material in the mix will exit the pulverizer without substantial reduction in size, allowing a size-based separation of glass from metals and plastic to be performed in the next step. In the preferred trommel separator, the glass particles are initially separated into particles of two different sizes, and the non-glass material of larger sizes is separated from the glass.

The preferred pulverizer comprises flexible impactors, which remove paper labels from the glass, so that larger scraps of paper exit the trommel screen, while any smaller bits of paper are mixed with the glass but are generally not adhered to the glass particles. First the fine glass particles are separated from the mix by the trommel screen. The screen used in the trommel may be selected such that glass sand of the desired dimension is recovered at this stage. Then, as the next larger size of glass particles and paper mix falls out the bottom of the trommel screen, like a waterfall, an air classification system blows a jet of air across the falling stream and the lighter paper material is caught up in the air flow, separating the paper from the heavier glass that continues falling straight down. The selective reduction of the glass and removal of the paper in the pulverizer along with the fines removal in the screen makes a clean separation by air classification possible.

The non-glass material that exits the trommel separator is comprised of paper, mixed plastics, aluminum, steel, and various organics. This material may be conveyed to a non-ferrous separator, typically a separator employing eddy current techniques, to remove the aluminum and any remaining ferrous metals from the mix. The aluminum, ferrous metals and mixed paper have value as separately recyclable commodities.

The fine pulverized glass sand that falls through the first part of the trommel screen is specific-sized construction sand. This glass sand would typically be an 8 mesh minus size, but it could be a 4 mesh minus or a 10 mesh minus depending on the engineering specification. The trommel screen can be changed to produce these different sizes as required. The organics will typically be less than 1%. The next larger size of glass out of the trommel screen, after air classification, referred to as glass gravel, will be conveyed to a second "regrind" pulverizer system to reduce it to likewise to fine glass sand. Alternatively, it can be diverted and sold as a construction aggregate and for many other hulk commodity uses.

Thus, according to one aspect of the present invention, the production of sand from glass is facilitated by providing two pulverizing systems, each comprising at least a pulverizer and a trommel, connected in series to ensure efficient and complete reduction of the glass to sand of desired size.

In the Andela '841 patent, some or all of the pulverized glass was further processed. In these steps of the process, the glass particles were sanitized, preferably by exposure to ozone, dried, and screened. After sterilization by ozonation, the glass particles were then metered into a fluidized bed dryer where a rapidly-flowing stream of hot air, typically 300 to 400 degrees F., heats the surfaces of the particles of glass as the particles are suspended in a fluidized bed of hot air. The glass was dried and organics were removed with the intense heat. However, the temperature was maintained low enough to keep any small bits of paper or plastics from burning or oxidizing, so that no ash was formed.

According to a further aspect of the present invention, the fluidized bed dryer is eliminated in favor of enclosing and heating the pulverizers and trommel screens of both pulverizing systems, which thus act as both size reduction and screening apparatus and as a drying system at the same time.

The clean glass particles thus produced are dry and clean enough to produce sand as needed in the construction industry. Thus, a high capacity, low energy usage, efficient system for producing engineered construction sand of glass is provided.

BRIEF DESCRIPTION OF THE DRAWINGS

The invention will be better understood if reference is made to the accompanying drawings, in which:

FIG. 4, extending over two sheets labelled FIGS. 4(a) and 4(b), is a side view taken from the lower side of FIG. 3; and FIG. 5, extending over two sheets labelled FIGS. 5(a) and 4(b), is ae elevational view taken from the left side of FIG. 3.

DESCRIPTION OF THE PREFERRED EMBODIMENTS

Figure 1:
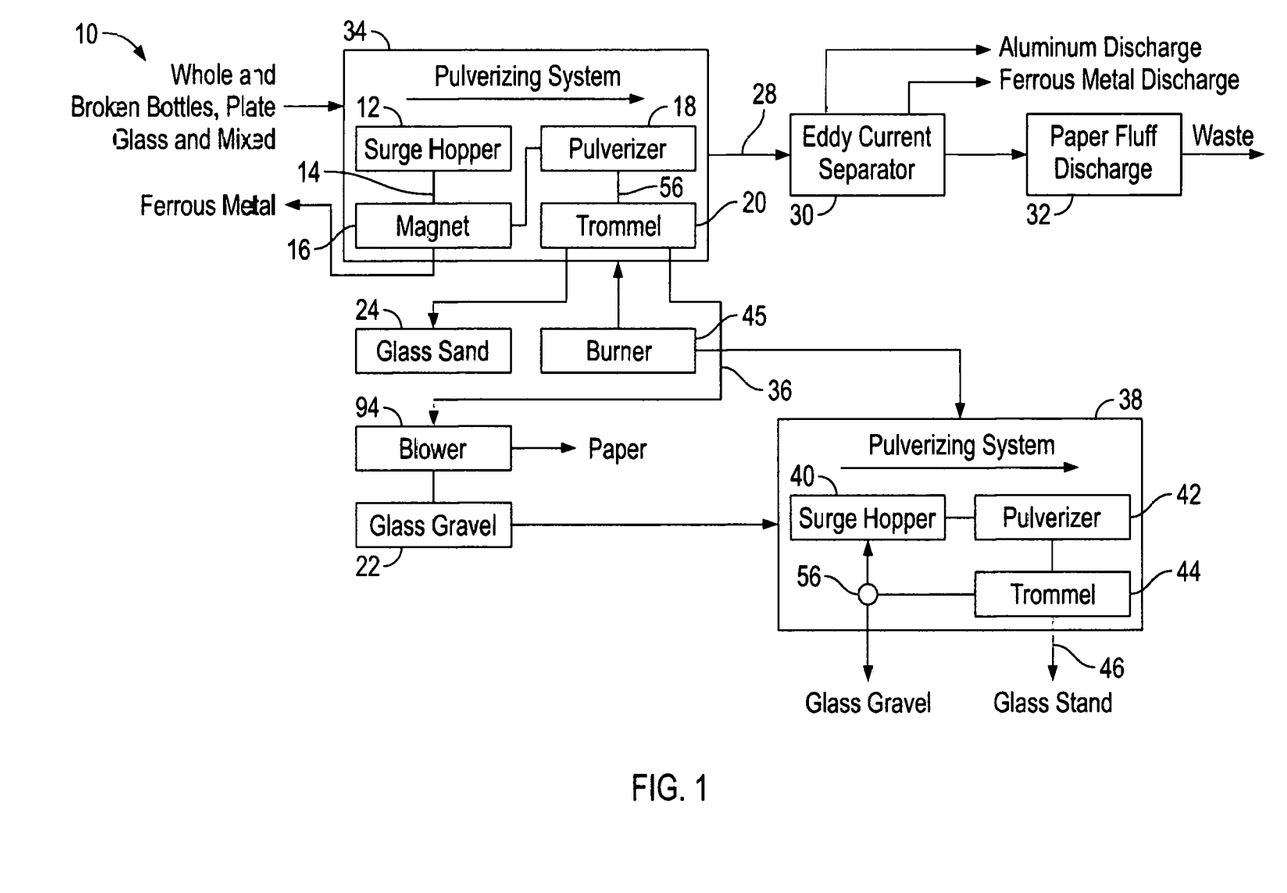
FIG. 1 is a schematic diagram of the overall process.

As indicated above, FIG. 1 shows a basic flow diagram of the process of the invention. The waste stream to be processed arrives at 10. In general, no pre-screening or pre-sorting of the mixture of broken glass, paper, plastic, and metal found in the typical post-consumer recycle stream is necessary, although the non-glass material mixed in with the glass should generally be less than six inches in largest dimension. Many post-industrial waste glass streams can be similarly processed.

This waste stream enters a first pulverizing system 34, comprising as indicated a surge hopper 12, a magnet 16, a pulverizer 18, and a trommel 20. More specifically, the unsorted, dirty post-consumer and/or post-industrial waste glass mix is loaded into a surge hopper 12 to meter the material onto a conveyor indicated at 14. The material is then conveyed under a cross-belt magnet 16 to remove the bulk of the ferrous metal; further steps described below remove any remaining ferrous metal, e.g., bottle caps that are still attached to bottles.

The material is then conveyed directly into a glass pulverizer 18, to selectively reduce the glass to particles less than ⅜" or ½" in size. The pulverizer 18 is preferably that shown on James Andela's U.S. Pat. No. 5,944,268, incorporated herein by this reference, which comprises pivoted impactors rotating about a generally horizontal axis in a barrel. The impactors are arranged about the axis of rotation in a spiral pattern, so as to provide an auger action moving the glass and other components of the waste steam from the entrance of the unit toward the exit. The impactors break the glass into particles that are generally cubical in shape, and do not exhibit sharp edges. The non-glass, less-frangible material in the mix will exit the pulverizer 18 without substantial reduction in size, allowing a size-based separation of glass from metals and plastic to be performed in the next step.

Figure 2:
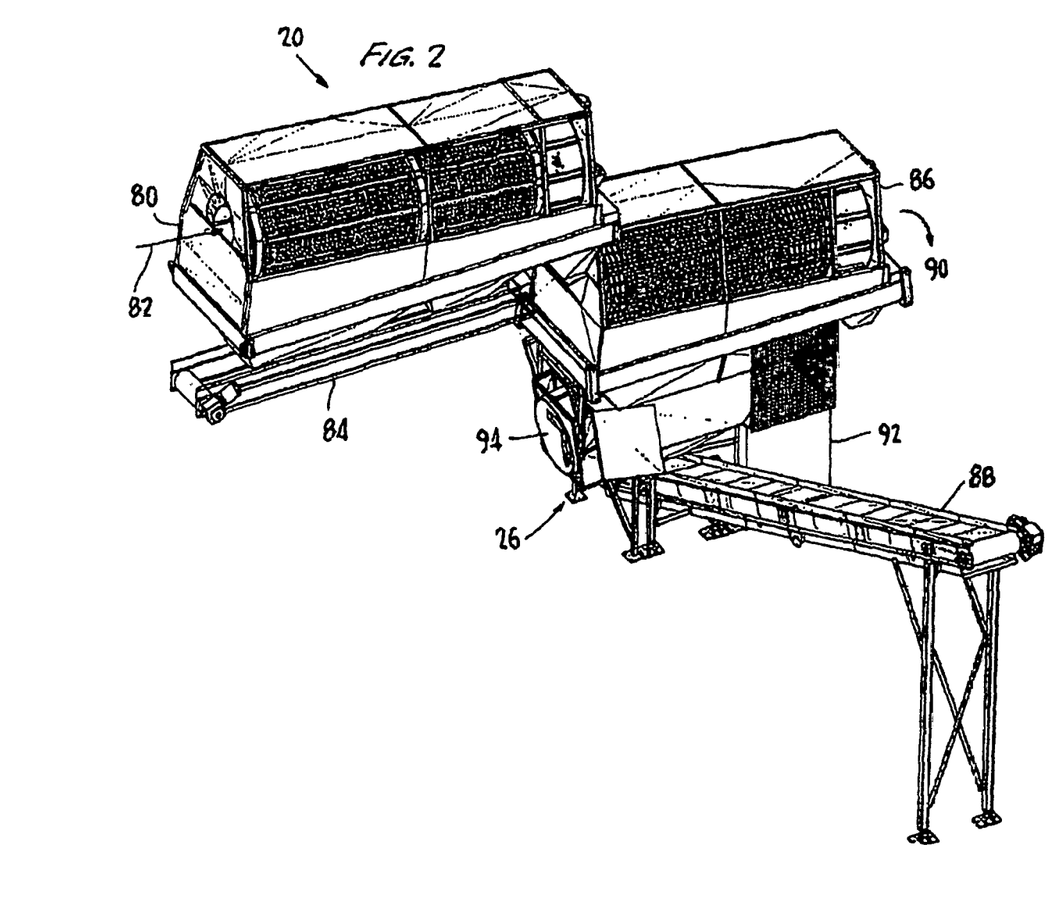
FIG. 2 is a perspective view of a trommel screen assembly.

As suggested, size-based separation of the glass particles from larger metal and plastic fragments is then performed, preferably in a rotating barrel or "trommel" screen separator 20 having at least two cylindrical screens of different mesh sizes, provided as one continuous barrel, or connected end-to-end, and rotating about a horizontal axis. Suitable equipment is shown in James Andela's U.S. Pat. No. 5,620,101, incorporated herein by this reference. The trommel separator 20 may comprise a single unit having two sizes of screen in series or two separate units having differently-sized screens. FIG. 2 shows a suitable assembly of the latter type. As illustrated, the trommel assembly 20 comprises a first unit 80 to which the incoming stream is admitted as indicated by arrow 82. The barrel screen of the first unit 80 will typically have a finer screen of approximately No. 8 mesh or No. 4 mesh so that the pulverized glass particles less than No. 4 mesh (or to other specifications) will fall through the first screen onto a conveyor 84 to be conveyed to a first collection bin (not shown). Glass sand of 3/16" maximum dimension, as separated by No. 4 mesh, is relatively coarse but meets the specifications for underdrain sand. Finer grades of glass sand as separated by No. 8 or No. 10 mesh minus is useful as construction sand, filter sand or beach sand. The pulverized glass particles greater than No. 8 or No. 4 mesh but less than the size of the second screen segment (typically 3/8" to 1/4" in size) will fall through the barrel screen of a second unit 86 onto a second conveyor 88 and be delivered to a second collection bin (not shown). The non-glass material larger than 1/2", that is, greater than the second screen size, will fall out the end of the trommel screen, as indicated at 90. The glass particles will have thus been separated into particles of two different sizes, and the non-glass material of larger sizes will have been separated from the glass.

The pulverizer's flexible impactors will have removed paper labels from the glass, so that bits of paper are mixed with the glass but are generally not adhered to the glass particles. In general, the pulverizer does not shred the paper to sizes less than No. 8 mesh, that is, approximately 1/8", so that the stream of glass particles exiting the No. 8 mesh or No. 4 mesh (as desired) screen of the first section 80 of trommel separator 20 includes less than 1% paper. Visible bits of shredded paper will be mixed with the glass particles too large to fall through the mesh of the first section. As this glass and paper mix falls out the bottom of the second section 86 of the trommel, like a waterfall, an air classification system 26, comprising a fan 94, blows a stream of air across the falling stream of glass and paper, so that the lighter paper material is caught up in the air flow, thus separating the paper from the heavier glass, which continues falling straight down. The glass falls onto a conveyor 88 for delivery to a bin (not shown) and the paper is directed by the air flow into a box chute 92 that allows the air to exit and the paper to fall into a separate container or conveyor.

Alternatively, the apparatus described in application 2020/0108413, incorporated herein by this reference, could be employed to separate paper from glass.

Thus, it can be seen that the selective reduction of the glass and removal of the paper in the pulverizer along with removal of the fines (that is, the glass particles less than the chosen mesh size) in the first section 80 of the trommel separator 20 makes an effective separation of paper from glass by air classification possible.

Returning to FIG. 1, the non-glass material that exits the end of the trommel separator is comprised of paper, mixed plastics, aluminum, steel (as some steel bottle caps and rings or lids may have been attached to bottles or confined under the glass on the conveyor 14, so as not to have been removed by the cross-belt magnet 16) and various organic materials adhering thereto. This non-glass material stream is conveyed at 28 to a non-ferrous separator 30, typically a separator employing eddy current techniques to remove the aluminum and ferrous metals from the mix. Suitable equipment is available from Eriez Magnetics of Caerphilly, UK, or from various other manufacturers of eddy current separation technology. A separation system 32 comprising an air classifier may then provide a general separation of the lighter weight paper and plastic from the heavier material. The aluminum, ferrous metals and mixed paper have value as separately recyclable commodities.

According to an aspect of the present invention, the pulverized glass that falls through the trommel screen and falls past the blower 94 is then conveyed by a conveyor 36 to a second pulverizing system 38, again comprising an optional surge hopper 40, a pulverizer 42, and a trommel 44, in that order. The effect of providing the second pulverizing system 38 is to ensure that the glass sand eventually produced at 46 is a uniform, engineered glass sand, suitable for general construction purposes, such as the making of concrete or as septic field filtration sand. A diverter 56 may be provided in the event a customer wants glass particles of larger size, referred to as "glass gravel", but the intent is that most of the glass will go through two stages of pulverization followed by size-based sorting in the trommels, to produce glass sand.

According to a further aspect of the invention, a burner 45 is provided which provides hot air to the pulverizers 18 and 42, and to the trommels 20 and 44, which are enclosed to retain the hot air. This has the effect of drying the glass as it is processed, allowing the elimination of the fluidized bed dryer of the Andela '841 patent. These units thus serve a dual purpose, simplifying the construction of the plant and reducing its cost.

Figure 3:
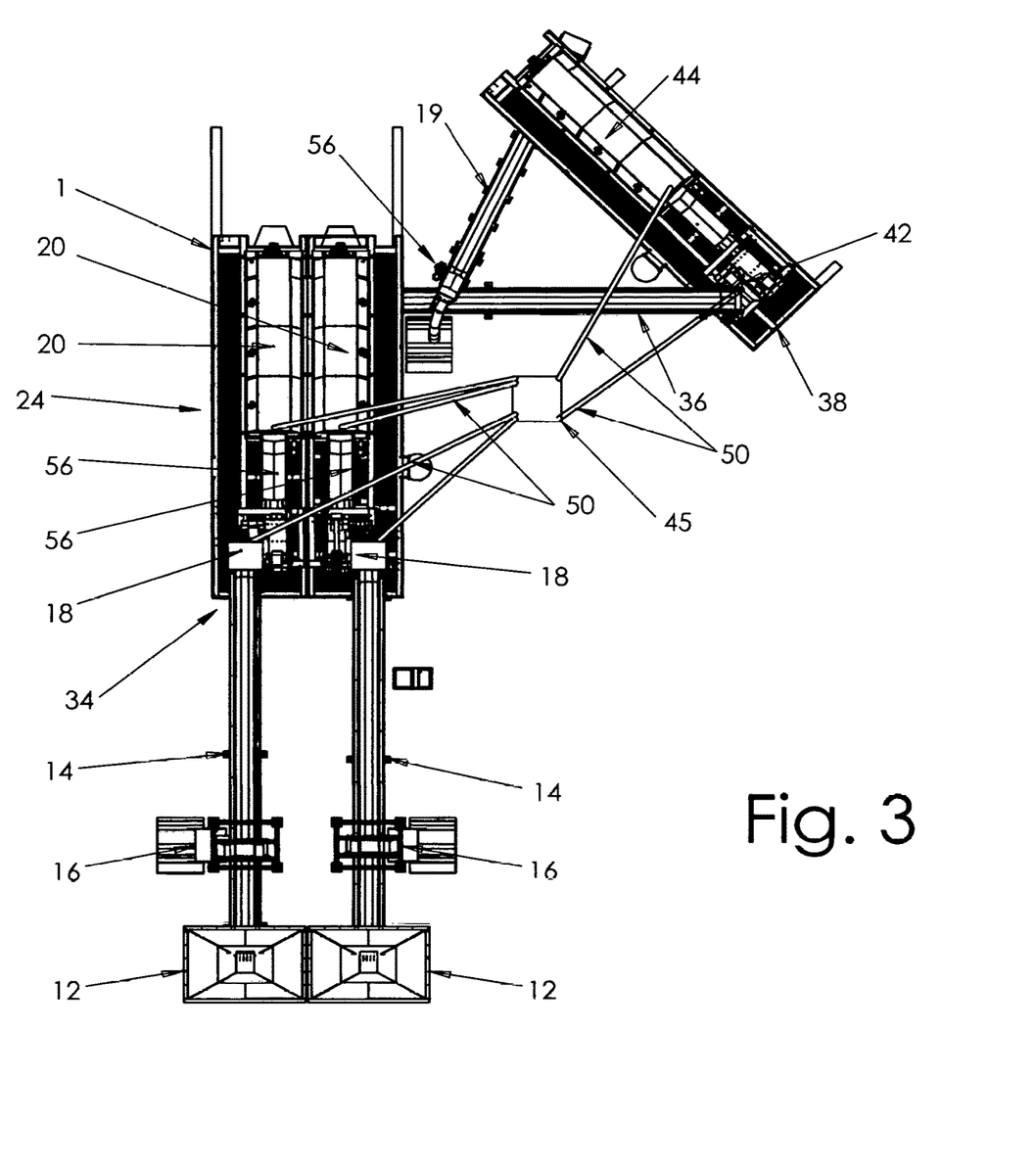
FIG. 3 is a plan view of the overall system.
Figure 4A:
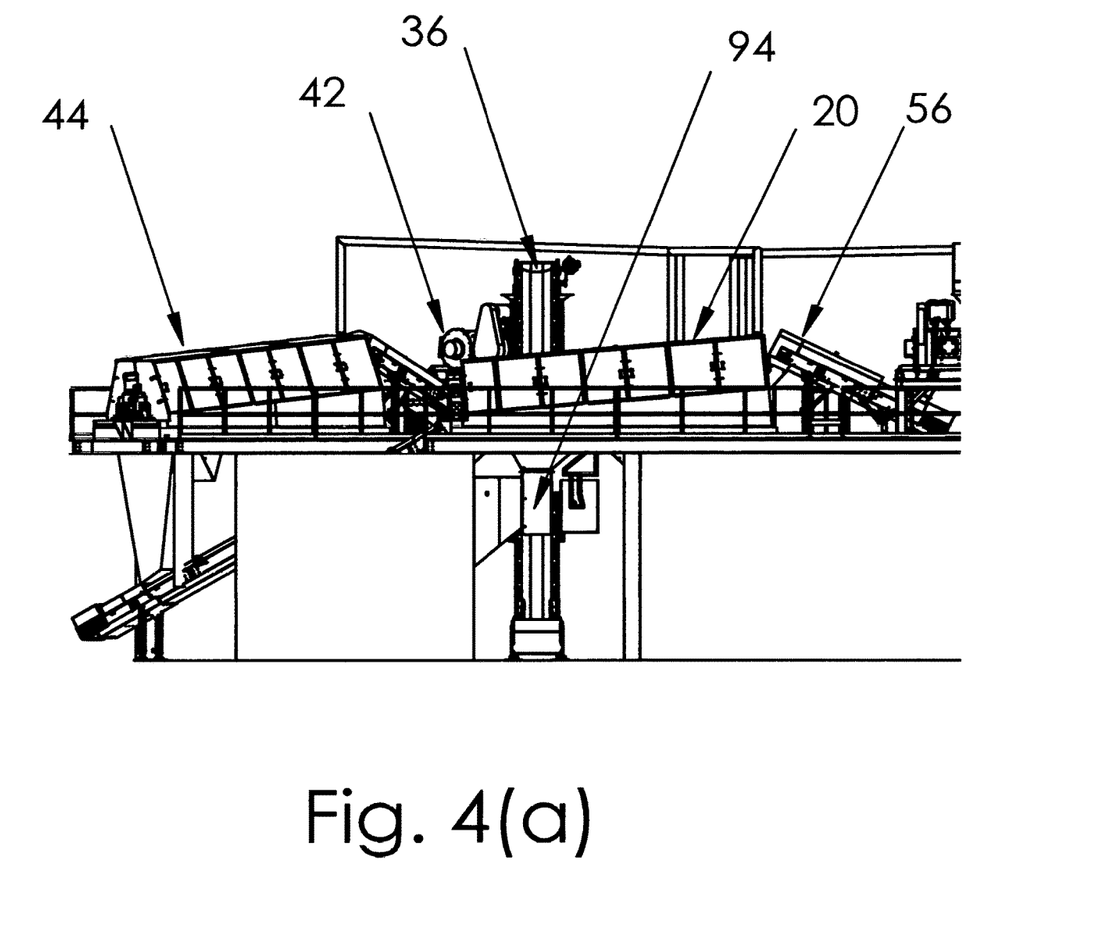
Figure 4B:
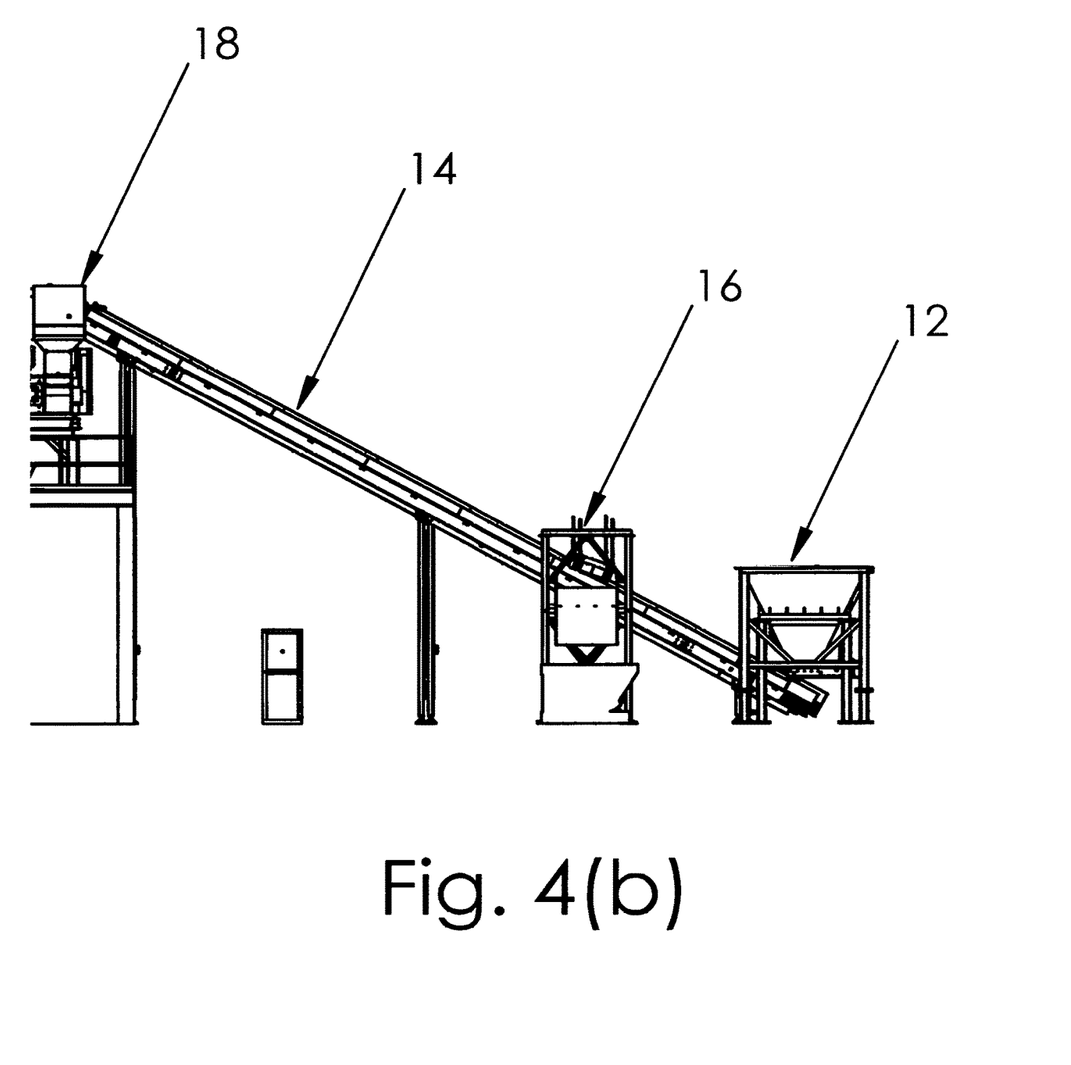
Figure 5A:
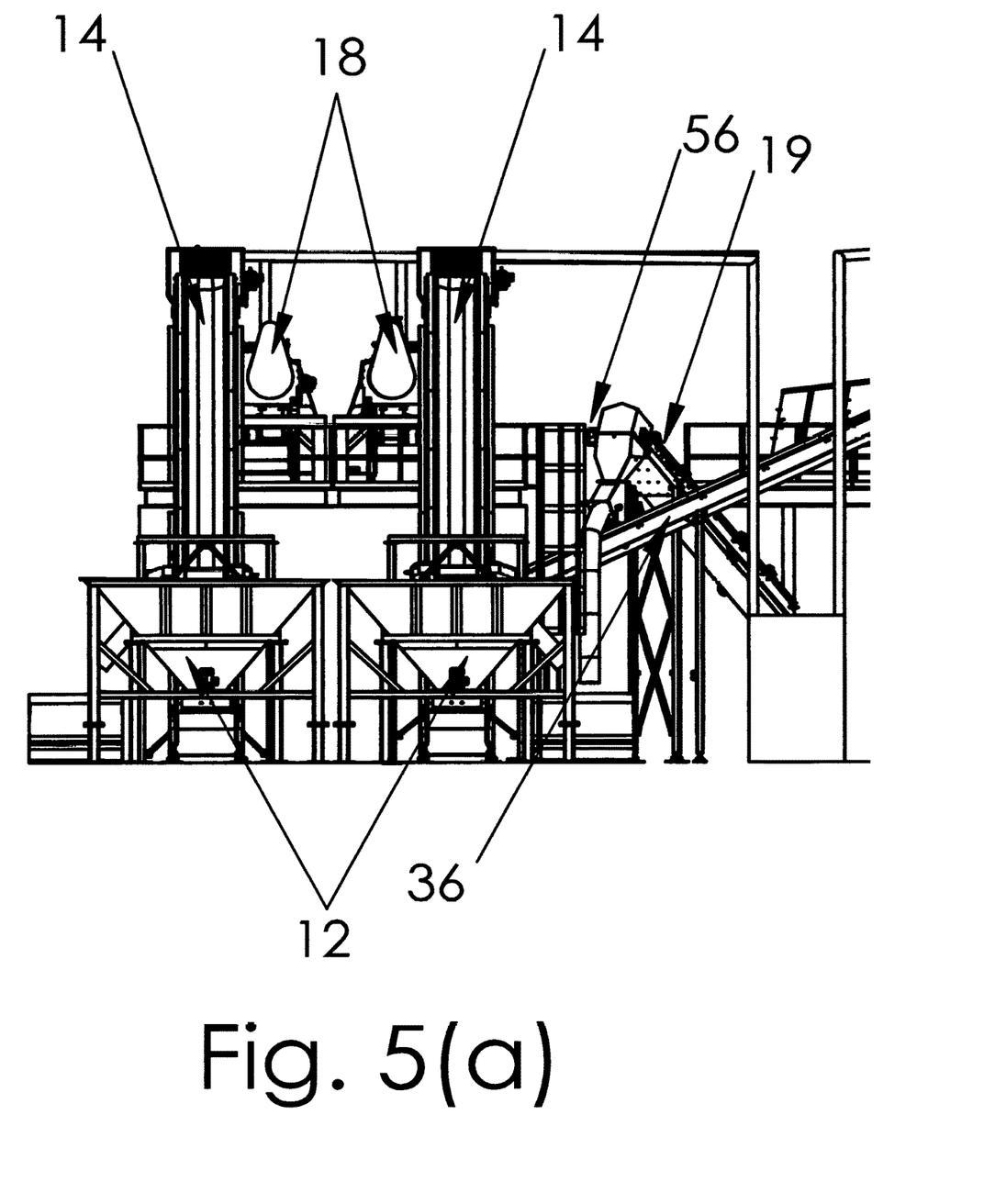
Figure 5B:
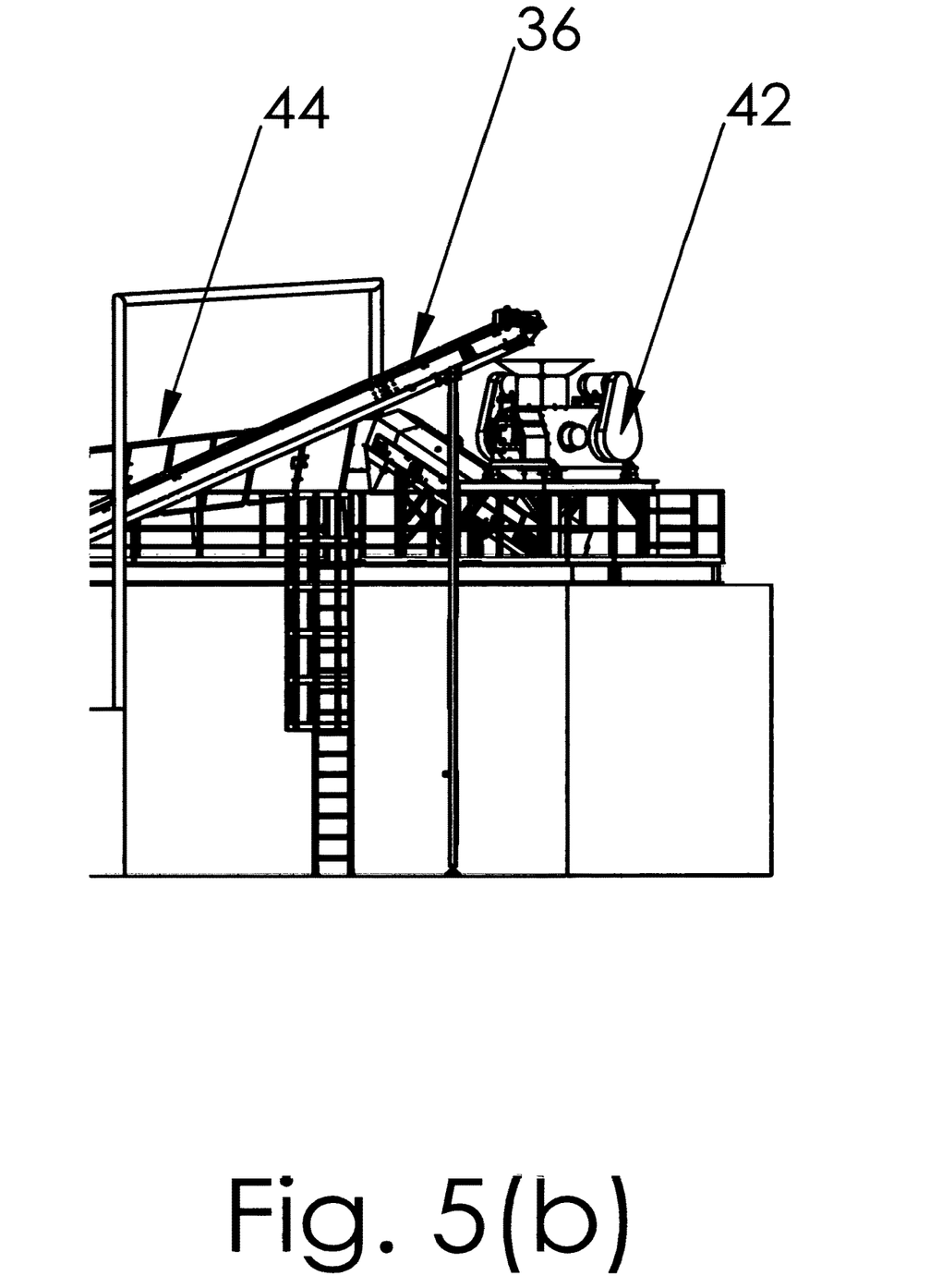

As indicated above, FIGS. 3-5 show external views of a typical plant embodying the invention. In the specific embodiment shown, the first pulverizing system 34 is duplicated, to increase the throughput of the overall system, which is sized to treat 40 tons, or more, of waste glass recyclables per hour.

Accordingly, as seen from above in FIG. 3, the plant comprises a first pulverizing system 34, comprising two surge hoppers 12, two magnets 16 disposed over infeed conveyors 14 to remove ferrous materials, two pulverizers 18, and two trommels 20. As indicated above, the pulverizers 18 and trommels 20 are enclosed, and are supplied with hot air from burner 45 via ductwork 50. Glass sand of below a desired maximum dimension is removed from the trommels 20 as indicated at 24. Larger particles of glass pass by way of "recirculation" conveyor 36 to a second pulverizing system 38, again comprising a pulverizer 42 and a trommel 44, both again being enclosed and supplied with hot air via ductwork 50.

Further details of the plant are also shown, including a paper removal blower system 94 visible in FIG. 4(*a*), and conveyors 56 visible in FIGS. 3 and 4(*a*).

The blower on the first pulverizer system 34 is to remove small pieces of paper from the "gravel" sized glass, before it goes into the second pulverizer system 38 to be reduced into sand. The pulverizer 18 will leave most of the paper larger than ½" so it will go out the end of the trommel screen as residue, but a small percentage of paper and plastics is the same size as the glass gravel (⅛"-½" in size); the blower system is designed to use air flow to remove this non-glass material as it falls through the air. It falls out of the trommel screen and the blower creates a cross-breeze or airflow to move the lightweight material into the same bunker with the other residue exiting the end of the trommel screen.

After the blower, the glass gravel falls onto the conveyor 36 that feeds the glass into the second pulverizer system 38. If there are some small pieces of plastics mixed in the glass that goes into the second pulverizer system 38, the pulverizer 42 will not break them down into sand, but allow them to go around a re-circulation loop for further processing. More specifically, any glass that is larger than the specification exiting out the end of the trommel 44, will go onto conveyor 19 (FIG. 3) and be conveyed back onto conveyor 36 to go around again, thus providing a re-circulation loop. The diverter 56 between the recirculation conveyor 19 and the conveyor 36 that feeds the pulverizer 42 can be operated to remove that residue. This results in clean glass sand, without non-glass being ground up into a sand size. This is due to the unique pulverizer reduction technology, specifically the flexible hammers described in James Andela U.S. Pat. No. 5,944,268.

The pulverizers used in the preferred embodiment shown in FIGS. 3-5 are preferably those sold by Andela Tool and Machine of Richfield Springs, NY as model GP-2HD and the trommels Andela model ATROM-105.

As noted above, the exemplary system shown in FIGS. 3-5 includes a first pulverizing system 34 including double pulverizers and double trommel screens to make it a high production system.

The double pulverizer system takes all types of glass and ceramics, and selectively reduces the glass into the glass sand and glass gravel sized materials. The residue is larger and exits the end of the trommel. Both glass gravel outputs from the double trommel screens go past a blower system to blow out light weight paper or plastics. The streams of gravel sized glass (⅛"-½") both go on a common conveyor 36 that feeds the second pulverizing system 38 comprising a single GP-2HD pulverizer and a single ATROM-105 trommel. This "sanding" pulverizing system finishes all the glass gravel off into a glass sand product. Variable speed drives on the feeders and pulverizer motors will allow the system to be adjusted to make a higher percentage of sand sized glass, and to adjust the overall productivity of the system.

The burners will add hot air to all the pulverizers and trommel screens (total of 6 units to heat). The pulverizer and trommel screens will thus have a dual purpose and function, that is, they will act as size reduction units and screening units while they also act as drying units to insure the fine sand will not clog the screens due to residual moisture. Since this heat source is similar in purpose to the furnaces for heating a room or building, there is no dust collector or "stack" so no air permits are required.

More particularly, the heating system will provide indirect heating using medium hot air. (100-300 degrees F.). The heated air will flow with the material through the pulverizer, conveyor and trommel screen. The air will not be too hot, so as not to burn any of the paper fluff. It will warm up the equipment (pulverizer, conveyor, trommel screen) so that the moisture in the pulverized glass will evaporate and the glass can fall freely through the screens.

The system is designed to pull in fresh air along with the heated air to provide an adequate volume of air for the moisture evaporated from the glass to dissipate. The moist air will exit the system with the warm glass, and go into the surrounding environment. It is not designed to dry the glass to the point where dust becomes an issue, but dry enough to allow it to pass through the sand sized screen on the trommel. A moisture detection system is incorporated to measure the moisture content of finished glass, and is used to provide feedback to the heating system to insure the air temperature is increased or decreased as needed depending on the output moisture content of the glass sand.

Thus, in summary, the system of the invention is designed to handle high tonnages of post-consumer or post-industrial waste as input, and provide sized glass sand as output. It will pulverize, size, and dry all in one system. The system of the invention will process glass mixed with waste/residue; will reduce only the glass into a sand-sized particle while leaving the residue larger, allowing a size-based separation; will clean the residue out of the fine glass; and will dry the material while it is going through the process, to insure it is screened into a fine glass sand while avoiding plugging of the screens.

The invention also comprises a method of producing glass sand from a mixed waste stream, the method comprising the steps corresponding to the system described above, as follows:

admitting a stream of mixed wastes to a first pulverizer, in which glass in the waste stream is pulverized to particles of at least a first minimum size while other materials in the waste stream are not reduced in size;

admitting the pulverized glass and other materials to a first trommel in which a size-based separation step is performed in order to separate the pulverized glass particles from the other materials;

admitting the pulverized glass to a second pulverizer, to further reduce the size of the pulverized glass particles;

admitting the further-reduced glass particles to a second trommel, in which the glass particles are sorted by size into different streams; and     collecting the differently-sized streams of glass particles; and     wherein streams of heated air are provided to each of the first and second pulverizers and the first and second trommels, whereby the glass particles are dried.

The method of the invention also includes the other steps inherent in the operation of the system described above, including but not limited to blowing a stream of air across a falling stream of pulverized glass mixed with other materials, so as to blow paper scraps out of the stream, and employment of magnetic and eddy-current techniques to remove metallic components of the waste stream.

While a preferred embodiment of the invention has been disclosed, the invention is not to be limited thereby, but only by the following claims.

What is claimed is:

1. A system for producing glass sand from a stream of mixed recycled material, comprising:

a first pulverizing system, comprising a surge hopper, a pulverizer and a trommel, for performing first size-reduction and size-separation steps;

a second pulverizing system, comprising a pulverizer and a trommel, for performing second size-reduction and size-separation steps;

a conveyor connecting said first and second pulverizing systems; and a burner for providing heated air to said pulverizers and trommels, whereby said pulverizers and trommels also serve as dryers.

2. The system of claim 1, further comprising a second conveyor disposed between said surge hopper and said pulverizer of the first pulverizing system, whereby said surge hopper meters said stream of mixed recycled material into said first pulverizing system.

3. The system of claim 2, further comprising a magnet for removal of ferrous metal items from said stream of mixed recycled material disposed over said second conveyor.

4. The system of claim 1, wherein said first pulverizing system is duplicated so as to include dual pulverizers and trommels.

5. The system of claim 1, wherein a size-separation screen comprised by said trommel of said second pulverizer is provided with apertures so as to produce a stream of glass particles sized to serve as sand.

6. The system of claim 1, further comprising a blower operated to direct a stream of air across a stream of pulverized material exiting the first trommel vertically downwardly, whereby paper scraps are blown from the stream.

7. A method of producing glass sand from a mixed waste stream, comprising the following steps:

admitting a stream of mixed wastes to a first pulverizer, in which glass in the waste stream is pulverized to particles of at least a first minimum size while other materials in the waste stream are not reduced in size;

admitting the pulverized glass and other materials to a first trommel in which a size-based separation step is performed in order to separate the pulverized glass particles from the other materials;

admitting the pulverized glass to a second pulverizer, to further reduce the size of the pulverized glass particles;

admitting the further-reduced glass particles to a second trommel, in which the glass particles are sorted by size into different streams; and collecting the differently-sized streams of glass particles; and wherein streams of heated air are provided to each of the first and second pulverizers and the first and second trommels, whereby the glass particles are dried.

8. The method of claim 7, comprising the further step of blowing a stream of air across a vertically-descending stream of materials exiting the first trommel, whereby scraps of paper are removed from the stream of materials.

9. The method of claim 7, comprising the further step of exposing the incoming stream of mixed waste to a magnetic field, whereby ferrous metal items are removed from the incoming stream of mixed waste.

* * * * *